United States Patent

Redman

[11] 3,906,500
[45] Sept. 16, 1975

[54] RADAR TARGET DIRECTION SIMULATOR
[75] Inventor: Charles M. Redman, Las Cruces, N. Mex.
[73] Assignee: The United States of America as represented by the Secretary of the Army, Washington, D.C.
[22] Filed: May 23, 1974
[21] Appl. No.: 472,778

[52] U.S. Cl. ............................. 343/17.7; 35/10.4
[51] Int. Cl.² .................. G01S 7/40; G01S 9/00
[58] Field of Search .......... 343/17.7, 6 ND; 35/10.4

[56] References Cited
UNITED STATES PATENTS

| | | | |
|---|---|---|---|
| 2,781,511 | 2/1957 | Pear, Jr. | 343/17.7 |
| 3,114,910 | 12/1963 | Rymes | 343/17.7 |
| 3,336,594 | 8/1967 | Hotz et al. | 343/17.7 |
| 3,365,579 | 1/1968 | Emshwiller | 343/17.1 R |
| 3,452,353 | 6/1969 | Neuendorf | 35/10.4 X |

*Primary Examiner*—Malcolm F. Hubler
*Attorney, Agent, or Firm*—Nathan Edelberg; Robert P. Gibson; Saul Elbaum

[57] ABSTRACT

A system for accepting radar signals containing information simulating target range in time and amplitude, target velocity as a doppler, and target signature as an amplitude scintillation and adding target angular simulations of target space position and scintillations is described. An acousto-optic modulator is provided wherein a radar signal containing selected target simulations modulates an optical, infrared signal, in accordance with the selected target simulations. Beam steering mirror galvanometers are provided to selectively direct the modulated IR radiation onto selected areas of an RF (radar frequency) array. The mirror galvanometers in combination with selected areas of the RF array function to add target angular simulations and target space position and scintillations to the other simulations contained in the radar signal. The IR radiation is converted to a radar frequency signal in the RF array and is transmitted to the radar test system.

10 Claims, 5 Drawing Figures

RADAR TARGET DIRECTION SIMULATOR

RIGHTS OF THE GOVERNMENT

The invention described herein may be manufactured, used, and licensed by or for the United States Government for governmental purposes without the payment to me of any royalty thereon.

BACKGROUND OF INVENTION

1. Field of Invention

The present invention relates to a system for simulating radar target information to a radar test system. More specifically, the present invention relates to a system for simulating target range, in time and amplitude; target velocity as a doppler; and target signature as an amplitude scintillation; and adding simulations of azimuth and elevation space position of the target along with suitable angular scintillation.

2. Description of Prior Art

There exists a need in the art for a system which can accurately simulate targets to complex radar systems. One approach heretofore included a large radar frequency (RF) detector array of elements as a central part of the scintillator. However, all signals in this prior art system were in the radar frequency range. A system of this type works fairly well in small test facilities, but for larger test facilities using larger RF arrays, the available radar frequency switching techniques and beam steering devices are inadequate to accurately simulate a target.

SUMMARY OF INVENTION

Accordingly, it is an object of the present invention to provide a system which accurately simulates target information to a radar test system.

It is a further object of the present invention to provide a radar target direction simulator, which operates over a broad bandwidth.

It is still a further object of the present invention to provide a radar target direction simulator with directional agility.

It is another object of the present invention to provide a radar target direction simulator which may handle a large number of target simulations.

It is still another object of the present invention to provide a radar target direction simulator having a quick accuracy verification capability.

The objects of the present invention are fulfilled by providing an infrared or optical link between the radar signal containing target simulations and an RF detector array. The infrared link is provided by a laser generator which generates a precision single frequency infrared reference signal. An acousto-optic modulator is provided to add the complex radar target simulation frequency and amplitude modulation to the infrared reference signal. A reference beam and a modulated beam emerge from the modulator in parallel. Mirror galvanometer means are provided for directing these beams onto a selected area of an RF detector array where said beams are converted back to radar frequency.

The radar signal transmitted to the acousto-optic modulator contains simulations of target range in time and amplitude, target velocity as a doppler, and target signature as an amplitude simulation. The mirror galvanometer direction means in combination with the RF detector array adds azimuth and elevation space position of the target as well as suitable angular scintillation to the simulations of the radar input signal. The radar target direction simulator of the present invention operates in conjunction with a Radar Target Generator (RTG) System and is related to the testing of radar systems in simulated environments of aircraft, missiles, electronic countermeasures, and electro-magnetic interference, and is normally related to testing within large RF Anechoic Chambers. The input to the simulator is a radar type signal at a center frequency of a selected intermediate frequency (IF) or the center frequency of a radar. For description of the present invention, a radar type signal assumes electronic countermeasures, and radio frequency interference as well as simulations of radar targets. This description considers an IF frequency of 1.5 GHz and a bandwidth of 0.5 GHz. The output of the RTDS is a radar type signal radiated from approximately four adjacent RF (radar frequency) radiating elements which have been electromechanically selected in an array of a large number of elements.

BRIEF DESCRIPTION OF DRAWINGS

The objects of the present invention and the attendant advantages thereof will become more readily apparent with reference to the following drawings wherein.

DETAILED DESCRIPTION OF DRAWINGS

The following description is specific as to frequencies only by way of example. Other frequencies may be used without departing from the spirit and scope of the present invention. However, there are preferred relationships between IR, IF, and RF frequencies and materials, as will become more apparent hereinafter.

Figure 1:
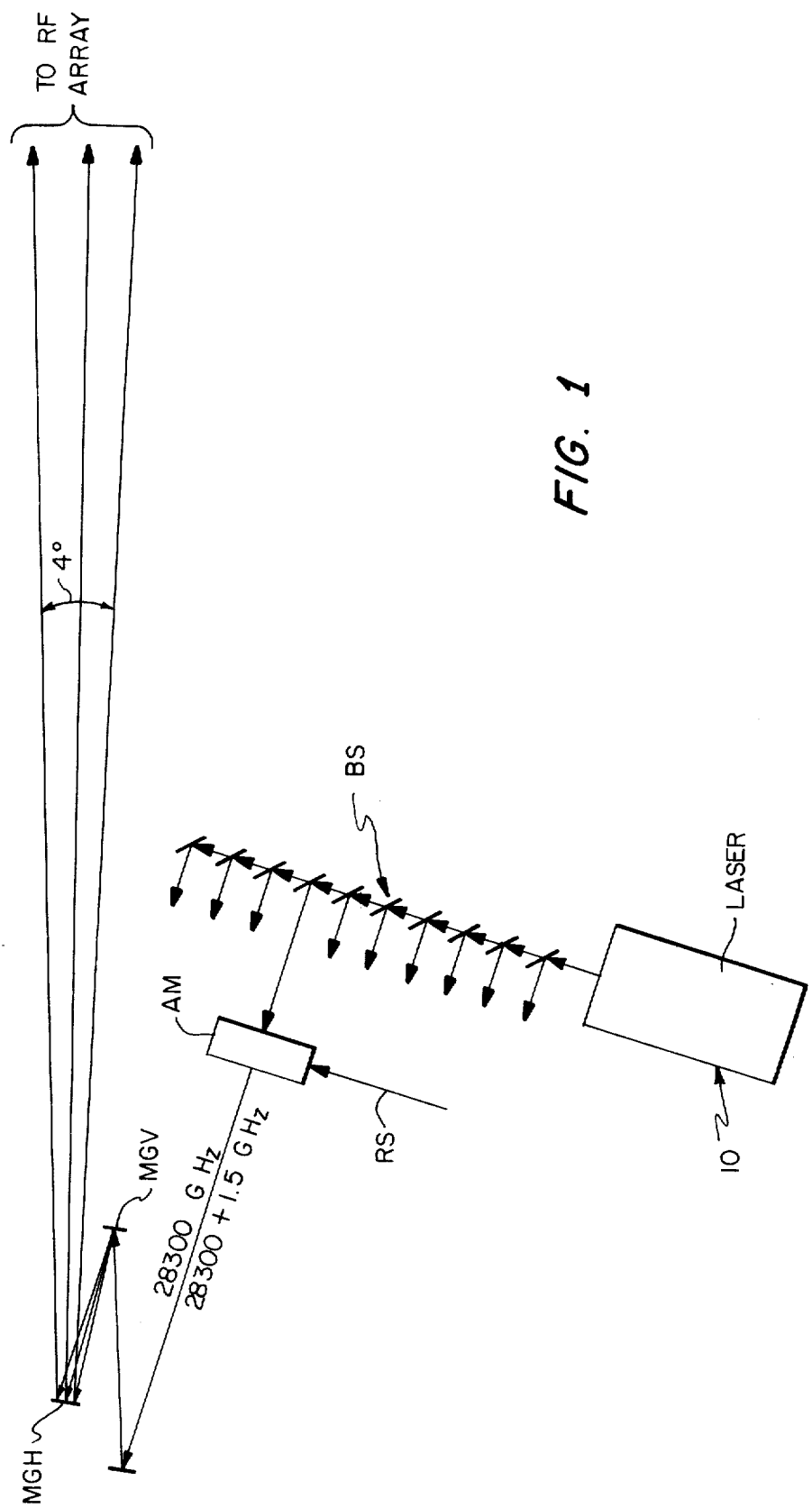
FIG. 1 illustrates the modulation and beam steering system of the present invention.

Referring in detail to FIG. 1 there is illustrated a $CO_2$ laser 10 which generates a 10.6 micron radiation line at 7 watts of power at a frequency of 28,300 GHz. The laser beam generated is directed toward a plurality of beam splitters BS to power a plurality of modulator beam steering systems. In the example shown in FIG. 1 ten such beam splitters are disclosed for directing beams along ten different channels. However, any number may be selected as desired.

Associated with each of the beam splitters BS is an acousto-optic modulator AM which received IR laser radiation from an associated beam splitter. The acousto-optic modulator includes a Tellurium (Te) crystal which will be further described hereinafter with reference to FIGS. 2 and 3.

The acousto-optic modulator is also supplied at one end thereof with a radar signal RS which is an IF signal within the band from 1,250 MHz to 1,750 MHz. This IF signal carries a radar signal which has been processed through a radar target generator where range delay, range attenuation, doppler, target amplitude signature, self-screening electronic countermeasures, and free space effects are added. This IF signal is impedance matched in the radar target generator to the acousto-optic modulator AM.

A Te crystal, as well as $G_aA_s$, crystal acousto-optic modulator is compatible with 1,500 MHz and the 10.6 micron $CO_2$ laser radiation line generated by laser 10. Other types of lasers and crystals can be used but the ratio of the wavelength of the IR in the crystal to twice the wavelength of the acoustic IF signal in the crystal must be less than one.

A laser signal at 28,300 GHz is passed through the acousto-optic modulator as shown in FIG. 1.

Figure 2:
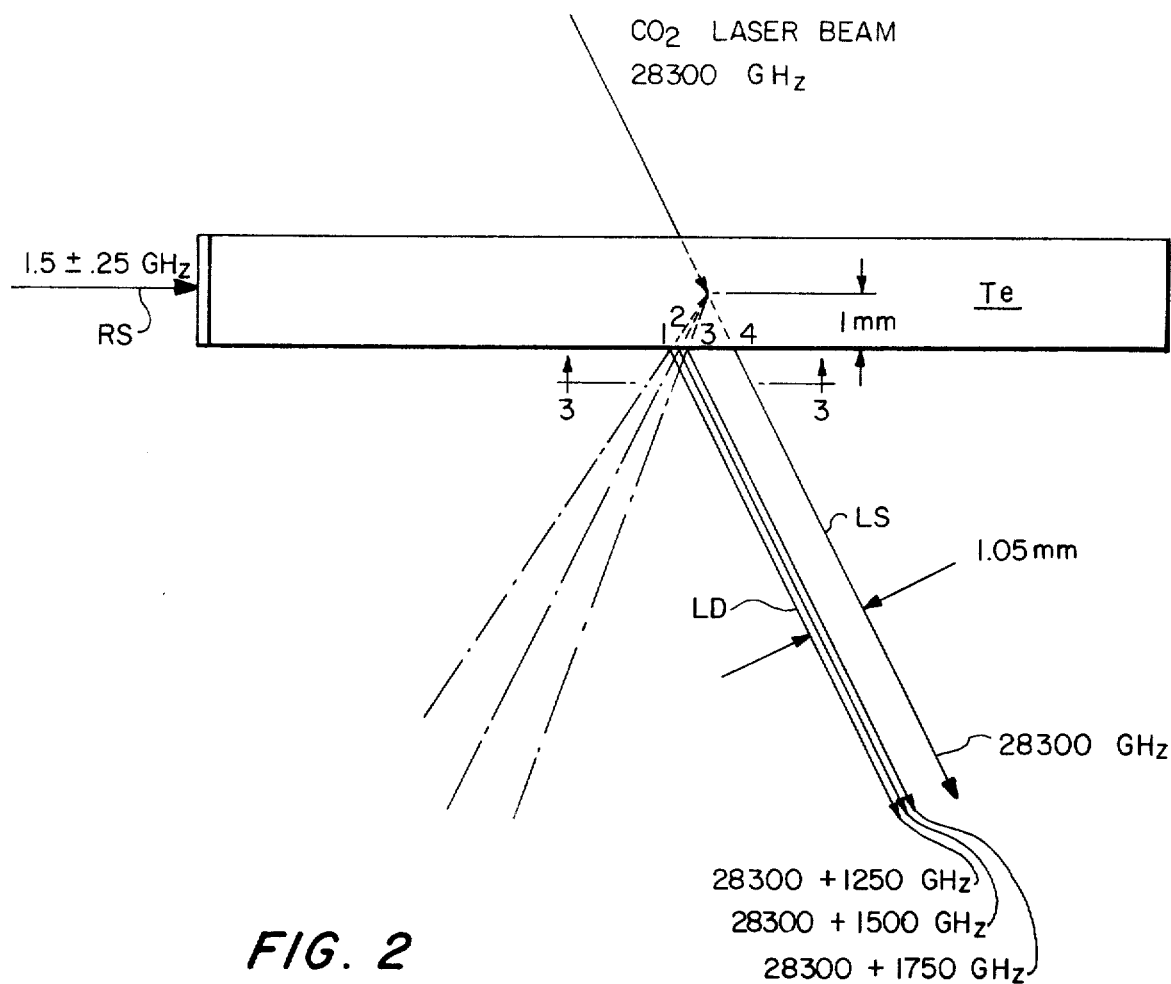
FIGS. 2 and 3 illustrate the operation of the modulator of the system of FIG. 1.
Figure 3:
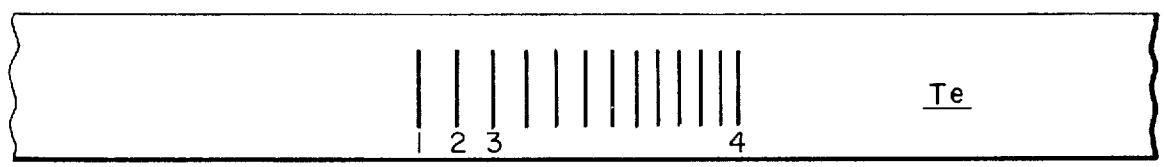

FIGS. 2 and 3 illustrate the operation of the acousto-optic modulator AM of FIG. 1.

FIG. 2 shows that part of the laser signal LS passes straight through the Te and a part LD is deflected. The magnitude of the deflected signal LD is directly related to the magnitude of the acoustic (radar data) signal RS. The frequency of the deflected signal is the laser frequency plus the acoustic signal frequency. Both plus and minus deflections are available but in this description the minus deflection is not used. The cosine of the angle of deflection is the wavelength of the IR signal divided by twice the wavelength of the acoustic signal; $\cos \theta = \lambda/2\Lambda$. Table I gives the relationships between the specific IF-acoustic and IR frequencies for Te.

TABLE I

| IF (MHz) | DEFLECTION DEGREES | WAVELENGTH (10.6 M) |
|---|---|---|
| 1250 | 60.9 | 1.760 |
| 1500 | 54.3 | 1.466 |
| 1750 | 47.8 | 1.256 |
| 2570 | 0 | 0.855 |

The Tellurium crystal of FIG. 2 functions as an IR diffraction grating in response to the acoustic radar signal transmitted therethrough. The grating spacing is very critical, in that it must cause the deflected signal LD to be deflected a second time equal to but opposite the first deflection so as to cause the beam carrying the radar LD to be exactly parallel with the beam LS passing directly through the crystal. The grating spacing must be tapered to allow the beam to emerge from the crystal parallel to the direct beam LS.

FIG. 3 illustrates an enlarged view of section 3—3 of the crystal of FIG. 2. As illustrated in FIG. 3 the grating lines of points 1, 2, 3, and 4 are spaced as specified in Table II.

TABLE II

| Point | Spacing |
|---|---|
| 1 | $0.88 \times 10^{-6}$ M |
| 2 | $0.73 \times 10^{-6}$ M |
| 3 | $0.63 \times 10^{-6}$ M |
| 4 | $0.43 \times 10^{-6}$ M |

Small errors in construction of the modulator can be adjusted out by adjusting the IF, the IR frequency, or the positioning of the crystal with respect to the laser beam.

The signal output of the modulator in the system of FIG. 1 is two beams in parallel. The major one of 28,300 GHz is a reference and the minor one of 28,300 + 1.5 GHz carries the radar signal and is present only when a radar signal is passing through the acoustic line at the point the IR beam is crossing it.

Referring again to FIG. 1 the two parallel beams are double deflected as shown in FIG. 1 by two mirrors rotated by galvanometers. Mirror galvanometers of this type are well known in the art. One mirror MGH rotates the beam in azimuth angle according to commands from a computer or other source and the other mirror MGV rotates the beams similarly in elevation angle. The galvanometers are nominally controlled by digital to analog converter to allow accurately positioning the beams. FIG. 1 shows 4 degrees peak-to-peak angular deflections in azimuth. This value is just an example and not a limit to the present invention. However, angular deflection would nominally be small and large X-Y motion on a plane in space is accomplished by use of a long lever arm.

Figure 4:
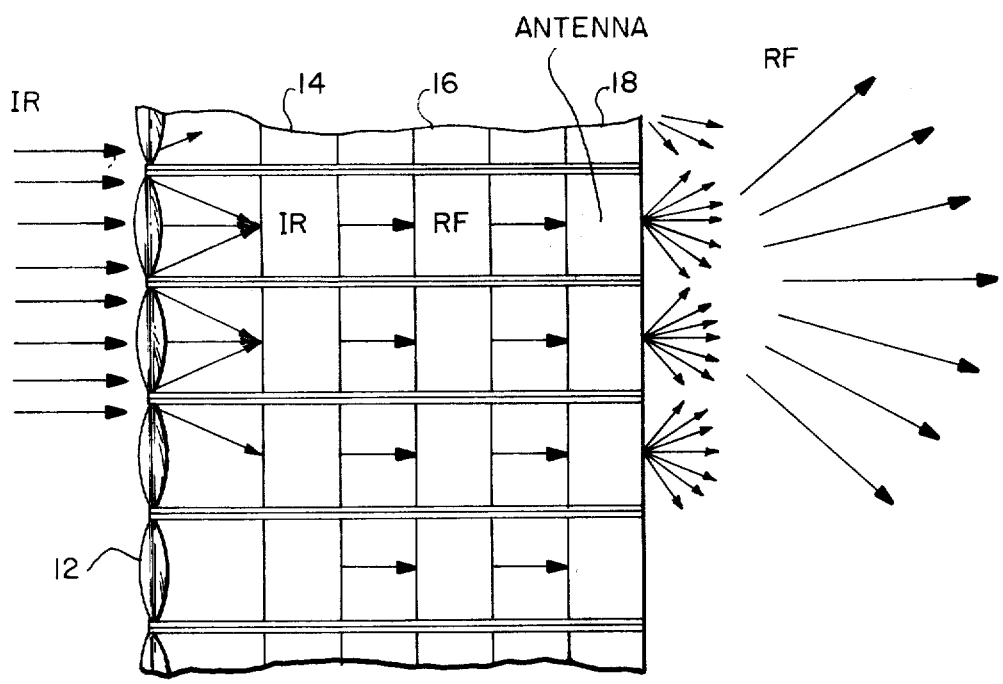
FIG. 4 is a side elevational view of an RF detector array suitable for use with the present invention.

The substantially parallel beams radiate a small circular area including primarily four elements on a RF detector array as shown in FIG. 4. The FIG. 4 example is for a 64 × 128 element array. The elements in the array are spaced one third radar beamwidth apart. The example assumes that 2.5 inches spacing between elements will furnish the desired one-third beamwidth. A 1.5° beamwidth antenna pattern would require a 24 ft. or greater spacing between the antenna and the array. At that distance the array would project 32° × 64°. The FIG. 4 8,192 element array is cited only as an example. The minimum number of elements are determined by the radar antenna pattern and the desired angular coverage.

Figure 5:
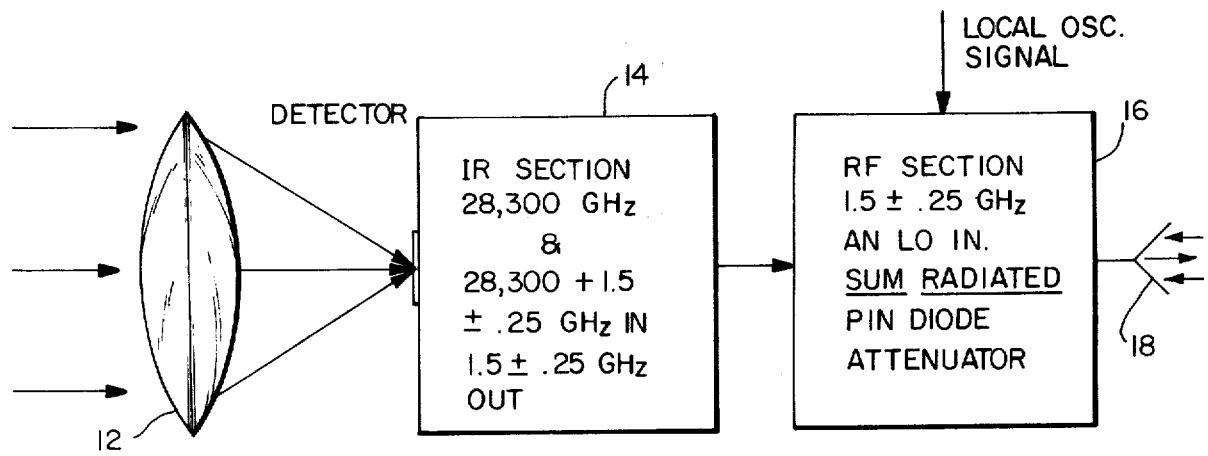
FIG. 5 is a diagrammatic block diagram illustrating the operation of the RF array of FIG. 4.

As shown in FIGS. 4 and 5 an input lens 12 focuses the energy onto a detector filter circuit 14 which extracts the difference frequency 1.5 ± .25 GHz IF, for example. The IF proceeds to the RF stage where it is attenuated in a PIN diode, mixed with a local oscillator signal, up converted to the original RF frequency, and radiated toward the radar by an antenna 18.

The array would be mounted sufficiently toward the radar far field, or if in the near field, a collimating device such as a Luneberg lens might be used to create a flat wavefront or in the case of a computer controlled phased array antenna a near focus program will be used. The PIN diode and its control circuit senses the level of the radar transmission and attenuates the IF signal inversely in proportion to that level. The PIN diode and its circuit, therefore, memorizes the radar transmit antenna pattern. The power distribution in the IR beams is filtered to match the IR detectors so that RF energy radiated from the elements does not ripple as constant amplitude beams are moved across the array.

SYSTEM OPERATION

In operation a laser beam in the 28,300 GHz infrared range is continually generated by laser source 10. The IR radiation is split into a plurality of beams (ten for example) by beam splitters BS and directed along ten different channels. Each channel is provided with an acousto-optic modulator AM and beam steering galvanometers MGV, MGH.

A portion of the IR laser signal is transmitted directly through modulator AM while a portion is double deflected and modulated by a radar signal RS containing simulated target information such as target range in time and amplitude, target velocity as a doppler, and target signature as an amplitude scintillation. This information contained in the radar signal RS is in effect added to a portion of the IR signal in modulator AM.

The portion of the IR signal passing directly through modulator AM emerges as a reference beam and the modulated portion of the IR signal emerges in parallel with the reference beam and contains the target information of radar signal RS.

The beams emerging from modulator AM are then selectively directed to specific areas of the RF transducer array of FIGS. 4 and 5 by mirror galvanometers MGV, MGH. This selective direction of the beams onto the RF array functions to simulate angular and target space position simulations and add them to the simulations in radar signal RS.

Thus a complete target simulation is created. The IR signals are converted back to radar frequency in the RF array 14, 16 and are transmitted to the radar under test by antenna 18.

In short the radar target direction simulator of the present invention accepts radar type signals with range delay, range attentuation, doppler, and target amplitude scintillation, and adds azimuth and elevation space position of the target to be simulated along with suitable angular scintillation. Both the radar transmit antenna patterns and the receive antenna patterns are considered.

I wish it to be understood that I do not desire to be limited to the exact details of construction shown and described, for obvious modifications can be made by a person skilled in the art.

What is claimed is:

1. A radar target direction simulator comprising in combination:
   a. means for generating a laser beam of a selected frequency and wavelength as a reference signal;
   b. means for modulating a portion of said reference signal, with a radar signal, said radar signal including information simulating said target;
   c. detector array means including a plurality of juxtaposed like detector elements for simulating target angular and space position and for converting said modulated and reference signals to a radar frequency signal; and
   d. means for directing said modulated reference signal and said reference signal toward a selected number of juxtaposed detector elements.

2. The simulator of claim 1 wherein said means for modulating comprises an acousto-optic modulator.

3. The simulator of claim 2 wherein said acousto-optic modulator comprises a tellurium crystal.

4. The simulator of claim 2 wherein said acousto-optic modulator comprises an elongated crystal including means for receiving said reference beam in a direction transverse to the longitudinal axis thereof and means for receiving said radar signal at one end of said longitudinal axis, said radar signal traveling along said longitudinal axis to intersect said reference beam and modulate the same in accordance with said, the information in said radar signal simulating said target.

5. The simulator of claim 1 wherein said means for directing said signals onto selected detector elements comprises mirror galvanometer means.

6. The simulator of claim 5 wherein said mirror galvanometer means includes a pair of mirror galvanometers for directing radiation in orthogonal directions to each other to control the direction of said signals in both azimuth and elevation.

7. The simulator of claim 1 wherein said selected frequency of said laser beam is 28,000 GHz and said wavelength is in the infrared range.

8. The simulator of claim 1 wherein the information simulating said target carried by said radar signal includes target range in time and amplitude, target velocity as a doppler, and target signature as an amplitude scintillation.

9. The simulator of claim 1 wherein said means for generating a laser beam comprises a primary laser source and a plurality of beam splitters for dividing said laser beam into a plurality of like beams to provide a multi-channel simulator.

10. The simulator of claim 1 wherein antenna means are provided for transmitting the radar frequency output signal from said detector array to a radar test system.

* * * * *